(12) United States Patent
Park et al.

(10) Patent No.: US 10,097,327 B2
(45) Date of Patent: Oct. 9, 2018

(54) METHOD FOR RECEIVING DOWNLINK DATA CHANNELS IN MULTICELL-BASED WIRELESS COMMUNICATION SYSTEMS AND APPARATUS FOR SAME

(71) Applicant: LG ELECTRONICS INC., Seoul (KR)

(72) Inventors: Jonghyun Park, Anyang-si (KR); Illsoo Sohn, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/359,776

(22) Filed: Nov. 23, 2016

(65) Prior Publication Data
US 2017/0078066 A1    Mar. 16, 2017

Related U.S. Application Data

(63) Continuation of application No. 14/373,184, filed as application No. PCT/KR2013/001071 on Feb. 12, 2013, now Pat. No. 9,544,110.
(Continued)

(51) Int. Cl.
*H04L 5/00* (2006.01)
*H04B 7/024* (2017.01)
(Continued)

(52) U.S. Cl.
CPC .......... *H04L 5/0048* (2013.01); *H04B 7/024* (2013.01); *H04L 1/1861* (2013.01);
(Continued)

(58) Field of Classification Search
CPC ..... H04B 7/024; H04L 5/0048; H04L 5/0053; H04L 5/0091; H04L 1/1861; H04L 5/0035; H04W 72/1273; H04W 88/02
See application file for complete search history.

(56) References Cited

U.S. PATENT DOCUMENTS 9,780,972 B2 * 10/2017 Sorrentino .......... H04L 25/0204
2011/0038310 A1    2/2011 Chmiel et al.
(Continued)

FOREIGN PATENT DOCUMENTS

KR    10-2011-0011524 A    2/2011
KR    10-2011-0086523 A    7/2011
(Continued)

OTHER PUBLICATIONS

Ericsson, "Discussion on quasi co-located antennas", May 21-25, 2012, 3GPP TSG-RAN WG4.*
(Continued)

*Primary Examiner* — Peter Chau
(74) *Attorney, Agent, or Firm* — Birch, Stewart, Kolasch & Birch, LLP

(57) ABSTRACT

A method and a user equipment (UE) for receiving, and a method and a base station (BS) for transmitting a UE specific reference signal based-downlink data channel in a wireless communication system are discussed. The method for receiving a UE specific reference signal based-downlink data channel according to an embodiment includes receiving a downlink control channel from a network; and receiving the UE-specific reference signal based-downlink data channel from the network based on the downlink control channel. The downlink control channel includes an indicator indicating one of two or more parameters configured by a higher layer. The two or more parameters indicate antenna ports of a certain reference signal which is assumed to be quasi
(Continued)

co-located with antenna ports of a UE-specific reference signal.

12 Claims, 16 Drawing Sheets

Related U.S. Application Data

(60) Provisional application No. 61/669,655, filed on Jul. 9, 2012, provisional application No. 61/597,725, filed on Feb. 11, 2012.

(51) Int. Cl.
*H04W 72/12* (2009.01)
*H04L 1/18* (2006.01)
*H04W 88/02* (2009.01)

(52) U.S. Cl.
CPC .......... *H04L 5/0053* (2013.01); *H04L 5/0091* (2013.01); *H04W 72/1273* (2013.01); *H04L 5/0035* (2013.01); *H04W 88/02* (2013.01)

(56) References Cited

U.S. PATENT DOCUMENTS

| | | | |
|---|---|---|---|
| 2012/0120842 A1 | 5/2012 | Kim et al. | |
| 2012/0176884 A1* | 7/2012 | Zhang | H04B 7/024 370/203 |
| 2013/0021991 A1 | 1/2013 | Ko et al. | |
| 2013/0182799 A1* | 7/2013 | Geirhofer | H04W 56/00 375/340 |
| 2013/0188558 A1 | 7/2013 | Nam et al. | |
| 2013/0194931 A1 | 8/2013 | Lee et al. | |
| 2013/0201840 A1* | 8/2013 | Sorrentino | H04L 25/0204 370/252 |
| 2013/0258964 A1* | 10/2013 | Nam | H04W 72/046 370/329 |
| 2013/0279437 A1 | 10/2013 | Ng et al. | |
| 2013/0301434 A1* | 11/2013 | Krishnamurthy | H04L 1/0026 370/252 |
| 2013/0301542 A1* | 11/2013 | Krishnamurthy | H04W 52/50 370/329 |
| 2014/0056270 A1 | 2/2014 | Ahmadi | |

FOREIGN PATENT DOCUMENTS

| | | |
|---|---|---|
| WO | WO 2011/013989 A2 | 2/2011 |
| WO | WO 2011/032033 A2 | 3/2011 |
| WO | WO 2011/039625 A1 | 4/2011 |
| WO | WO 2011/046387 A2 | 4/2011 |
| WO | WO 2011/090353 A2 | 7/2011 |

OTHER PUBLICATIONS

3GPP TS 36.213 V10.4.0, "3rd Generation Partnership Project; Technical Specification Group Radio Access Network; Evolved Universal Terrestrial Radio Access (E-UTRA); Physical layer procedures (Release 10)", Dec. 2011, 125 pages.

3GPP, "RAN1 Chairman's Notes" (3GPP Draft-R1-122960), 3GPP TSG RAN WG1 Meeting #69, Prague, Czech Republic, May 21-25, 2012 (downloaded by EPO on May 25, 2012), 35 pages.

Alcatel-Lucent et al., "Further Discussion of Quasi-co-located antenna ports," 3GPP TSG-RAN1 Meeting #69, R1-122458, Prague, Czech Republic, May 21-25, 2012 (downloaded by EPO on May 13, 2012), 3 pages.

Hitachi Ltd., "Discussion on CSI-RS Configuration," 3GPP TSG-RAN WG1 #67, R1-113970, San Francisco, USA, Nov. 14-18, 2011 (downloaded by EPO on Nov. 9, 2011), pp. 1-4.

Huawei et al., "Considerations on DL and UL DCI for CoMP," 3GPP TSG RAN WG1 Meeting #69, R1-121952, Prague, Czech Republic, May 21-25, 2012, 6 pages.

Huawei et al., "Discussion on Antenna Ports Collocation," 3GPP TSG RAN WG1 Meeting #69, R1-122512, Prague, Czech Republic, May 21-25, 2012, 8 pages.

Motorola Mobility, "Downlink RS Configuration for CoMP," 3GPP TSG RAN1 #68, R1-120523, Dresden, Germany, Feb. 6-10, 2012 (downloaded by EPO on Jan. 31, 2012), pp. 1-3.

ZTE, "CSI-RS configurations for CoMP," 3GPP TSG RAN WG1 Meeting #67, R1-113762, San Francisco, USA, Nov. 14-18, 2011 (downloaded by EPO on Nov. 9, 2011), pp. 1-3.

Ericsson, "Discussion on Antenna Ports Co-location", Mar. 2012, 3GPP TSG RAN WG1.

Ericsson, "Draft LS response on antenna ports co-location", Mar. 2012, 3GPP TSG-RAN 1.

Renesas Mobile Europe, "Transmission mode and DCI content for Release 11", May 2012, 3GPP TSG-RAN WG1.

\* cited by examiner

FIG. 2
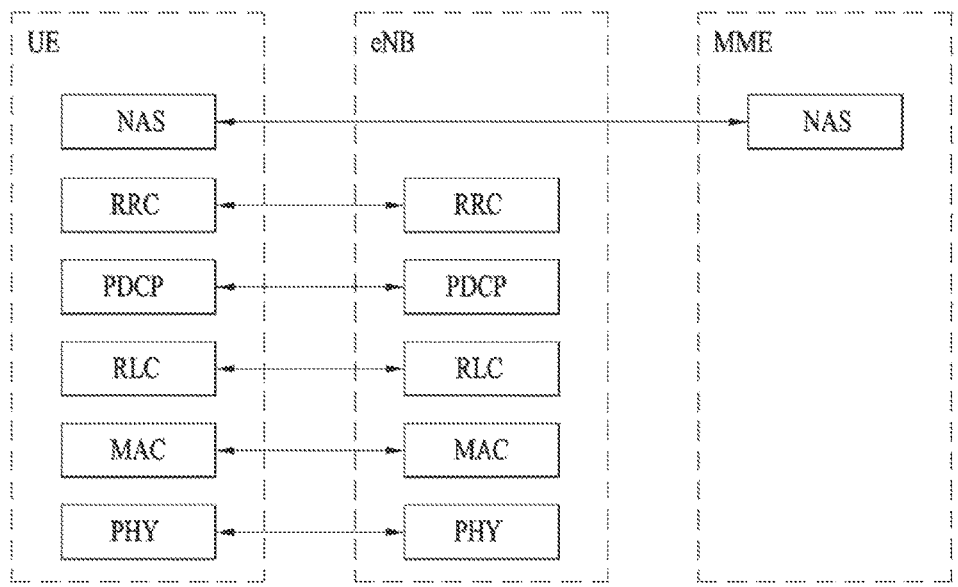
(a) control plane protocol stack
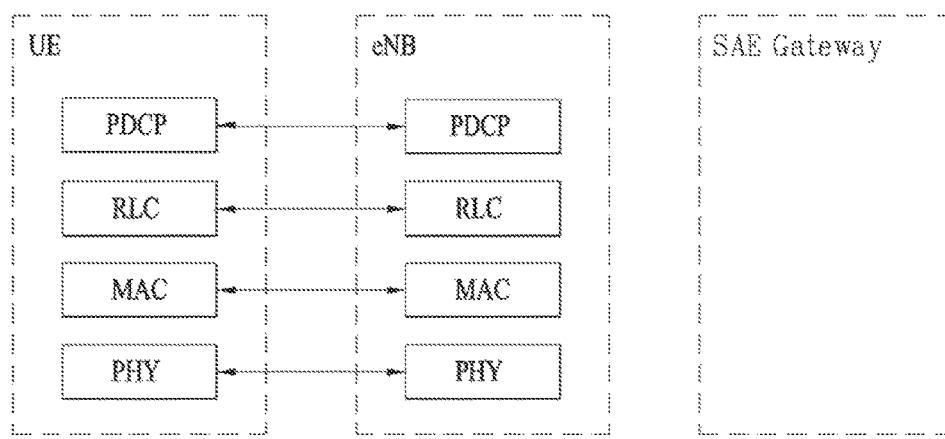
(b) user plane protocol stack ☒ : DMRS group 1

☐ : DMRS group 2

METHOD FOR RECEIVING DOWNLINK DATA CHANNELS IN MULTICELL-BASED WIRELESS COMMUNICATION SYSTEMS AND APPARATUS FOR SAME

CROSS-REFERENCE TO RELATED APPLICATIONS

This Application is a Continuation of co-pending U.S. patent application Ser. No. 14/373,184 filed on Jul. 18, 2014, which is filed as the National Phase of PCT/KR2013/001071 filed on Feb. 12, 2013, which claims the benefit under 35 U.S.C. § 119(e) to U.S. Provisional Application No. 61/669, 655 filed on Jul. 9, 2012 and 61/597,725 filed on Feb. 11, 2012, all of which are hereby expressly incorporated by reference into the present application.

BACKGROUND OF THE INVENTION

Field of the Invention

The present invention relates to a wireless communication system, and more particularly, to a method of receiving a downlink data channel in a multicell-based wireless communication system and an apparatus therefor.

Discussion of the Related Art

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

SUMMARY OF THE INVENTION

Accordingly, the present invention intends to propose a method receiving a downlink data channel in a multicell-based wireless communication system and an apparatus therefor in the following description based on the discussion mentioned earlier in the foregoing description.

To achieve these and other advantages and in accordance with the purpose of the present invention, as embodied and broadly described, according to one embodiment, a method of receiving a UE-specific reference signal based-downlink data channel, which is received by a user equipment in a wireless communication system, includes the steps of receiving information on one or more configurations defining large scale property of the UE-specific reference signal from a network via an upper layer, detecting scheduling information of the UE-specific reference signal based-downlink data channel from the network and receiving the UE-specific reference signal based-downlink data channel from the network based on the scheduling information, wherein the scheduling information includes an indicator indicating one of the one or more configurations.

Meanwhile, to further achieve these and other advantages and in accordance with the purpose of the present invention, as embodied and broadly described, according to a different embodiment, a method of transmitting a UE-specific reference signal based-downlink data channel, which is transmitted by a network in a wireless communication system, includes the steps of transmitting information on one or more configurations defining large scale property of the UE-specific reference signal to a user equipment via an upper layer, transmitting scheduling information of the UE-specific reference signal based-downlink data channel to the user equipment and transmitting the UE-specific reference signal based-downlink data channel to the user equipment, wherein the scheduling information includes an indicator indicating one of the one or more configurations.

Preferably, the information on the one or more configurations can include information on a certain reference signal capable of assuming that the UE-specific reference signal is identical to the large scale property. Moreover, the information on the one or more configurations can include information on there is no specific reference signal capable of assuming that the UE-specific reference signal is identical to the large scale property. In this case, the certain reference signal corresponds to a channel status information-reference signal (CSI-RS).

More specifically, the information on the certain reference signal indicates resource configuration information of the certain reference signal.

More preferably, the large scale property corresponds to information on a frequency offset and information on a timing offset for synchronization tracking. More specifically, the large scale property includes at least one selected from the group consisting of Doppler spread, Doppler shift, average delay and delay spread.

According to embodiment of the present invention, a user equipment can efficiently receive a downlink data channel in a multicell-based wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

FIG. 2 is a diagram for structures of control and user planes of radio interface protocol between a 3GPP radio access network standard-based user equipment and E-UTRAN;

DETAILED DESCRIPTION OF THE EMBODIMENTS

Figure 1:
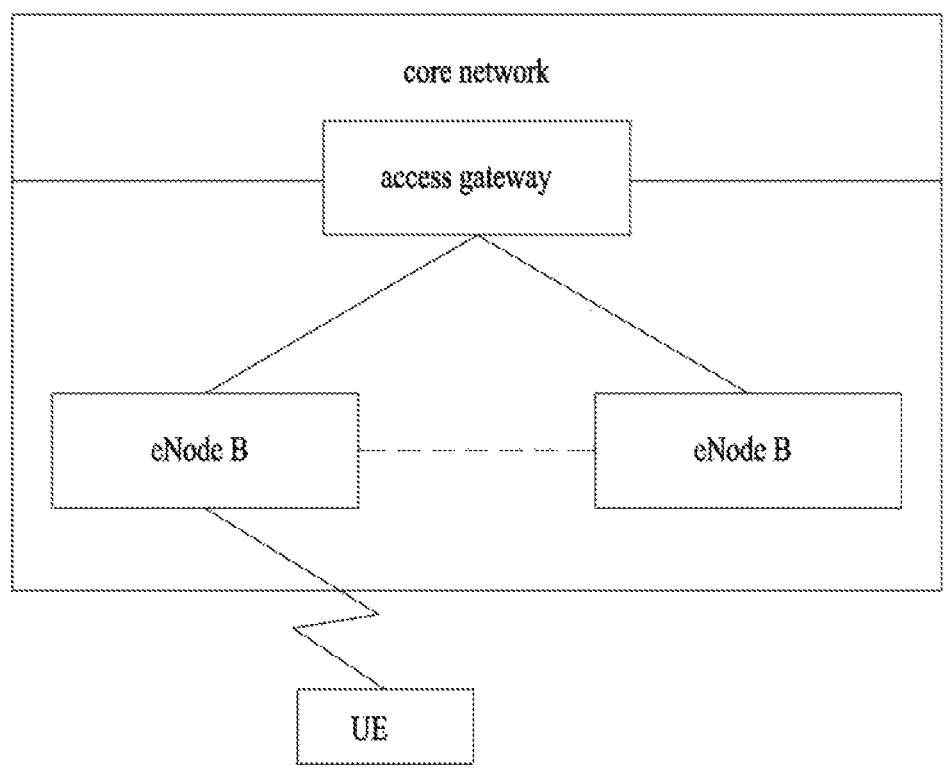
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
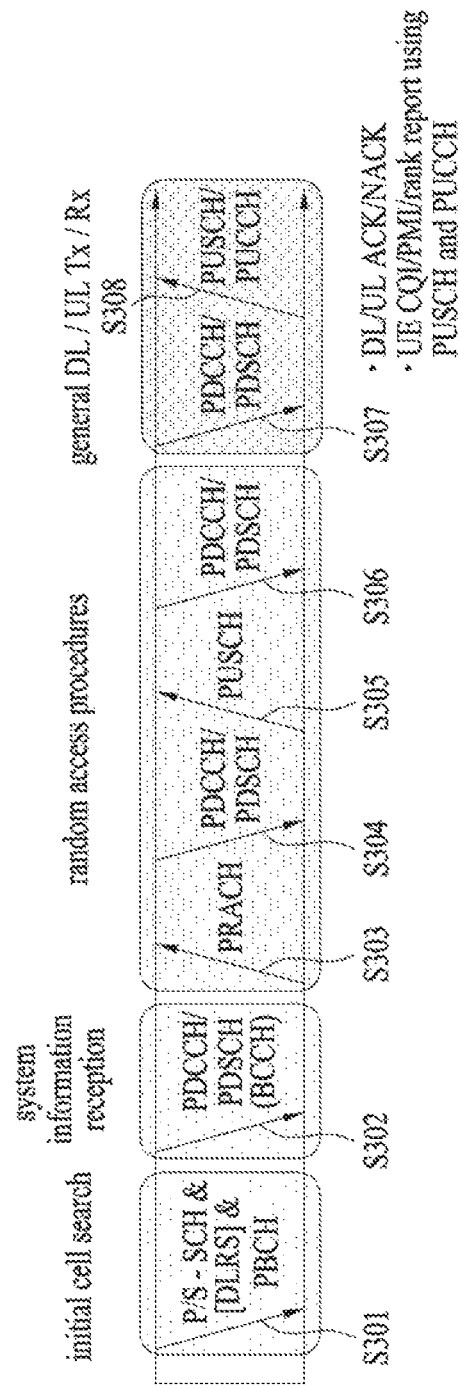
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
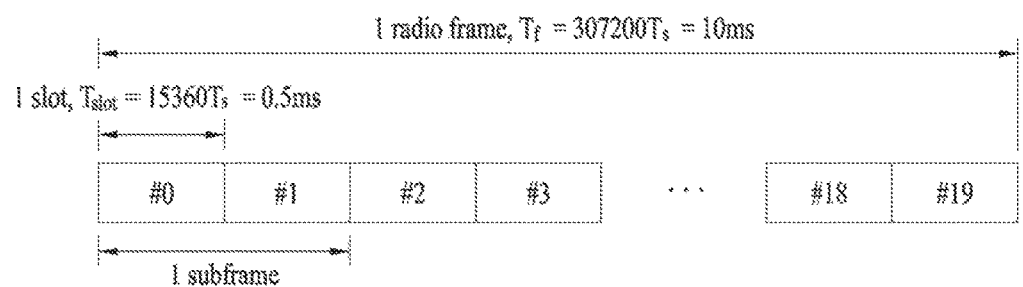
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
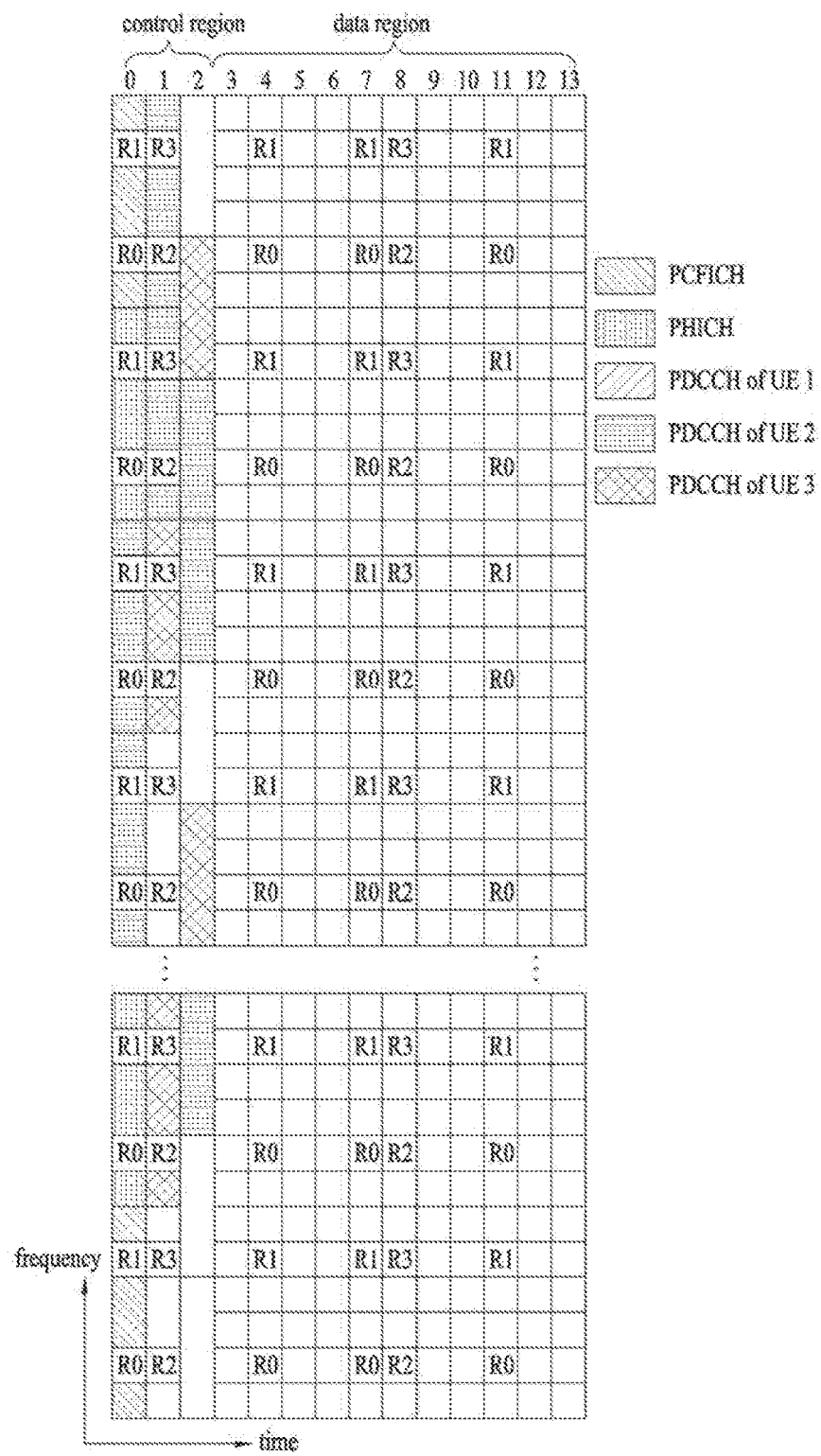
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
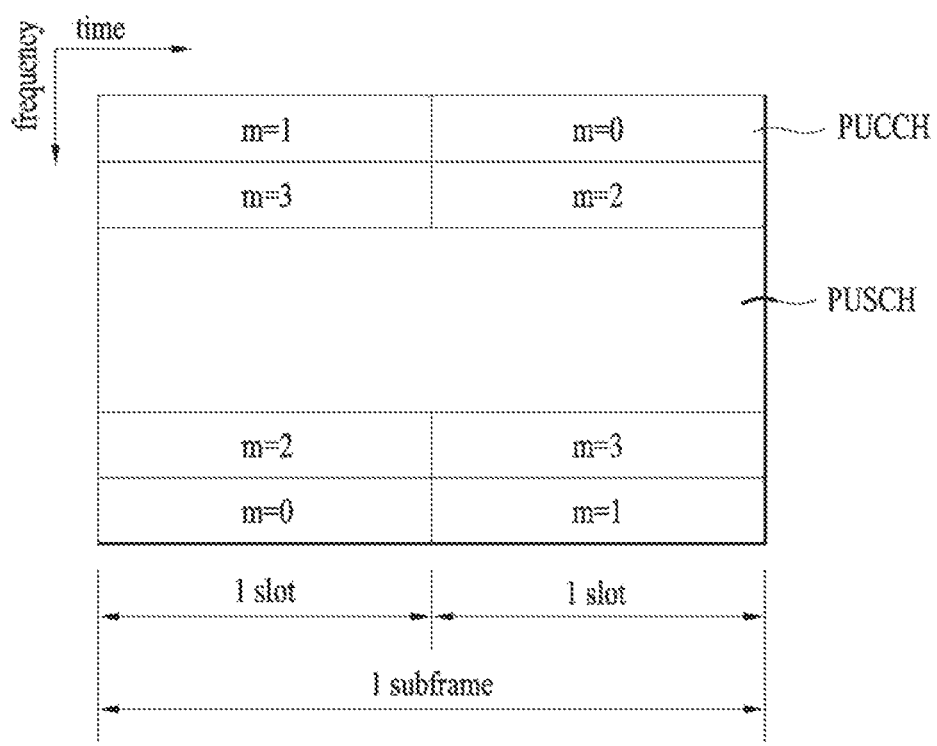
FIG. 6 is a diagram for a structure of an uplink radio frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
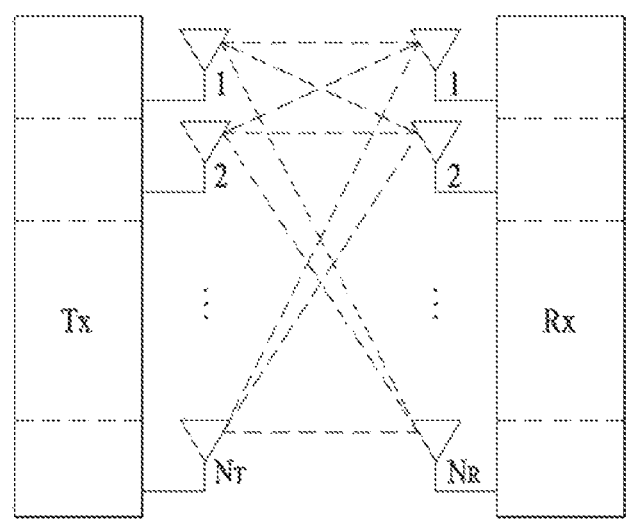
FIG. 7 is a diagram for a configuration of a multiple antenna communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s=[s_1,s_2,\ldots,s_{N_T}]^T \quad \text{[Formula 2]}$$

Meanwhile, for each of the transmission informations $s_1, s_2, \ldots s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Formula 3]}$$

And, if ŝ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
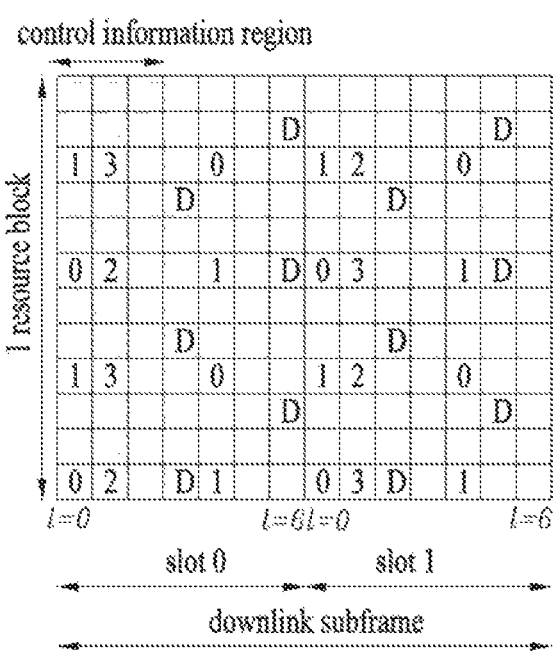
FIG. 8 and FIG. 9 are diagrams of a structure of a reference signal in LTE system supportive of downlink transmission using 4 antennas.
Figure 9:
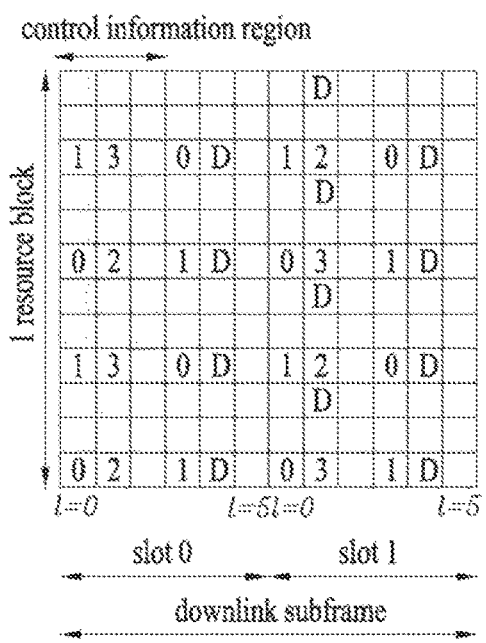

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
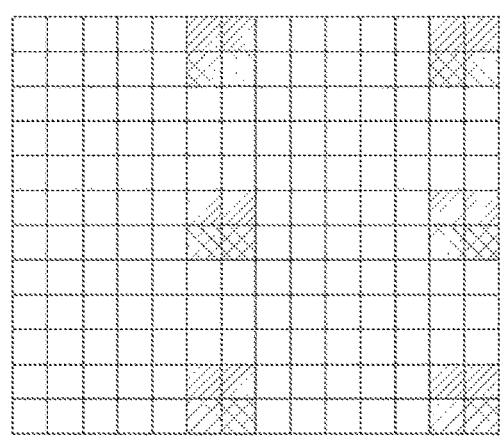
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 resource configurations different from each other to reduce inter-cell interference (ICI) in a multicell environment.

Figure 11:
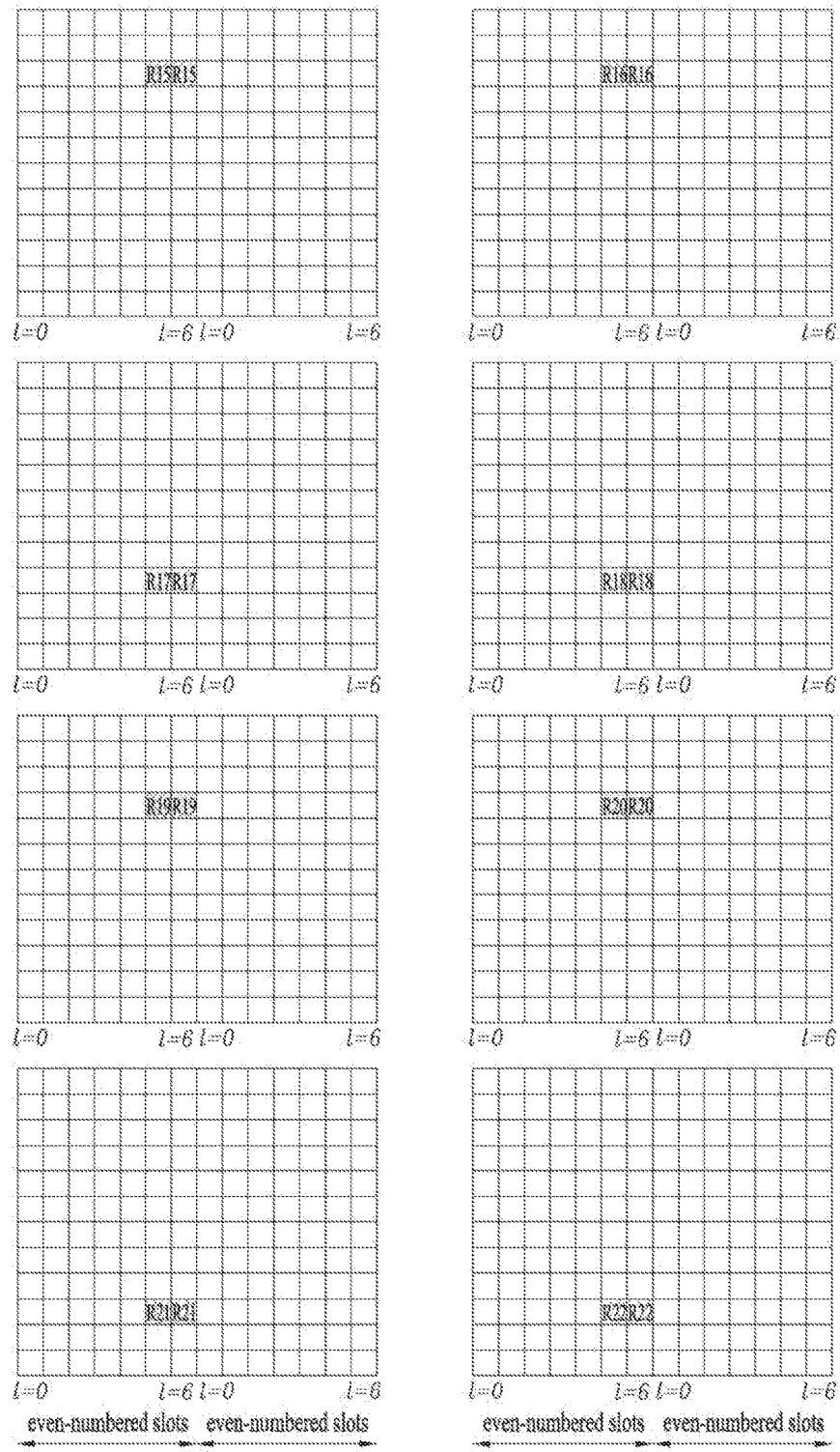
FIG. 11 is a diagram for an example of a CSI-RS configuration #0 in case of a normal CP among downlink CSI-RS configurations defined by a current 3GPP standard document.

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. FIG. 11 is a diagram for an example of a CSI-RS (resource) configuration #0 in case of a normal CP among CSI-RS configurations defined by a current 3GPP standard document.

Meanwhile, as various devices requiring high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user.

A system equipped with the node of high density may have higher system performance by means of cooperation between nodes. Compared to a node operating as an independent base station without cooperation, the aforementioned scheme may have superior performance.

Figure 12:
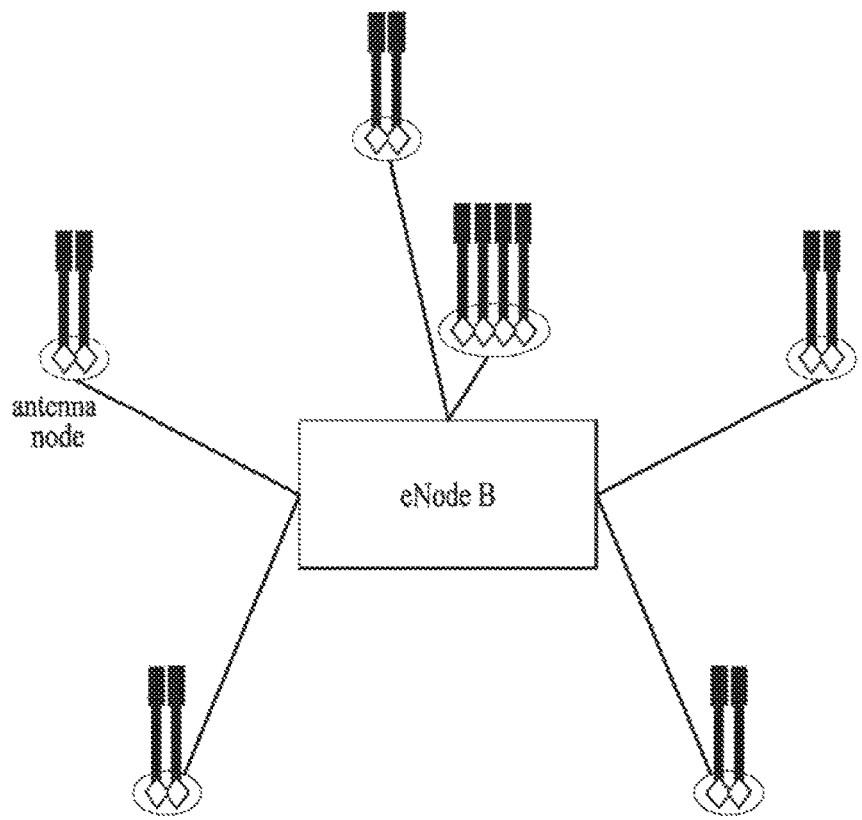
FIG. 12 is a diagram for an example of a multi node system in a next generation communication system.

FIG. 12 is a diagram for an example of a multi node system in a next generation communication system.

Referring to FIG. 12, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only.

Figure 13:
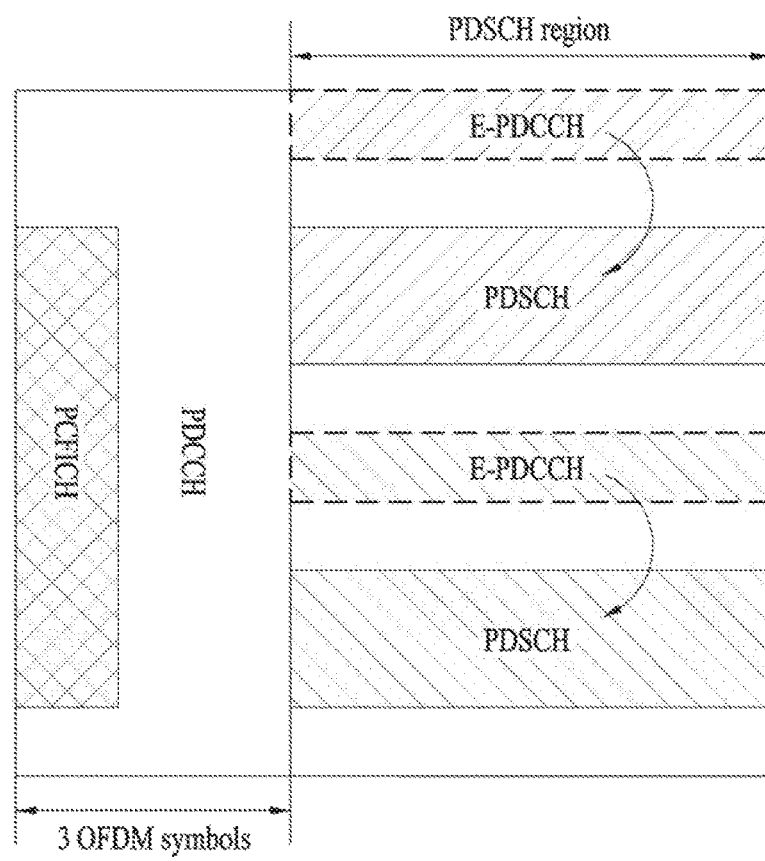
FIG. 13 is a diagram for an example of E-PDCCH and PDSCH scheduled by the E-PDCCH.

FIG. 13 is a diagram for an example of E-PDCCH and PDSCH scheduled by E-PDCCH.

Referring to FIG. 13, E-PDCCH can be used in a manner of defining a part of PDSCH region, which is generally transmitting data. A UE should perform a blind decoding process to detect presence or non-presence of the E-PDCCH in the UE. The E-PDCCH performs a scheduling operation (i.e., PDSCH, PUSCH control) identical to that of a legacy PDCCH. Yet, if the number of such a UE accessed a node as an RRH increases, more E-PDCCHs are assigned to the PDSCH region. Hence, the number of blind decoding, which should be performed by the UE, increases and complexity may increase as well.

In the following description, an example for a transmission mode of a downlink data channel is described.

Currently, 3GPP LTE standard document, specifically, 3GPP TS 36. 213 document defines a transmission mode of a downlink data channel as shown in Table 1 and Table 2 in the following. The transmission mode is set to a user equipment via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

TABLE 2

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
|  | DCI format 1 | Single-antenna port, port 5 |
| Mode 8 | DCI format 1A | Single-antenna port, port 7 |
|  | DCI format 2B | Single-antenna port, port 7 or 8 |
| Mode 9 | DCI format 1A | Single-antenna port, port 7 |
|  | DCI format 2C | Single-antenna port, port 7 or 8, |
| Mode 10 | DCI format 1A | Single-antenna port, port 7 |
|  | DCI format 2D | Single-antenna port, port 7 or 8, |

Referring to Table 1 and Table 2, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 1 shows an example of a case that a type of RNTI masked on PDCCH corresponds to a C-RNTI and Table 2 shows an example of a case that the type of RNTI masked on PDCCH corresponds to an SPS C-RNTI.

As an example of an operation of a transmission mode, referring to Table 1, if a user equipment performs a blind decoding on PDCCH masked with C-RNTI and then detects a DCI format 1B, the user equipment decodes PDSCH in an assumption that the PDSCH has been transmitted with a closed-loop spatial multiplexing scheme using a single transmission layer.

In Table 1 and Table 2, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

Based on the aforementioned contents, a method of receiving a downlink data channel in a multicell-based wireless communication system and an apparatus therefor according to the present invention are explained in the following. In particular, the present invention proposes a method of calculating or assuming large-scale properties for each of radio channels from a CoMP set, i.e., TPs participating in CoMP and a method of obtaining synchronization in order for a user equipment to receive a downlink signal in the multicell-based wireless communication system.

The user equipment can obtain synchronization via a primary synchronization signal (PSS) and a secondary synchronization signal (SSS) periodically transmitted from TPs within a CoMP set. After an initial synchronization is obtained, the user equipment calculates timing offset (delay spread and average delay), frequency offset (Doppler spread and Doppler shift) and the like by consistently tracking a reference signal and can maintain the synchronization. As a reference signal for the tracking, a CSI-RS, a CRS or the like can be used. The user equipment maintains the synchronization with TP using information including the timing offset, the frequency offset and the like calculated by the tracking and can demodulate PDSCH. In this case, as defined in LTE system, demodulation of the PDSCH means DM-RS-based demodulation. Using the information including the timing offset, the frequency offset and the like may mean that an antenna port of a DM-RS and an antenna port of a CSI-RS or a CRS, which is a reference signal used for the tracking, are in QCL.

Figure 14:
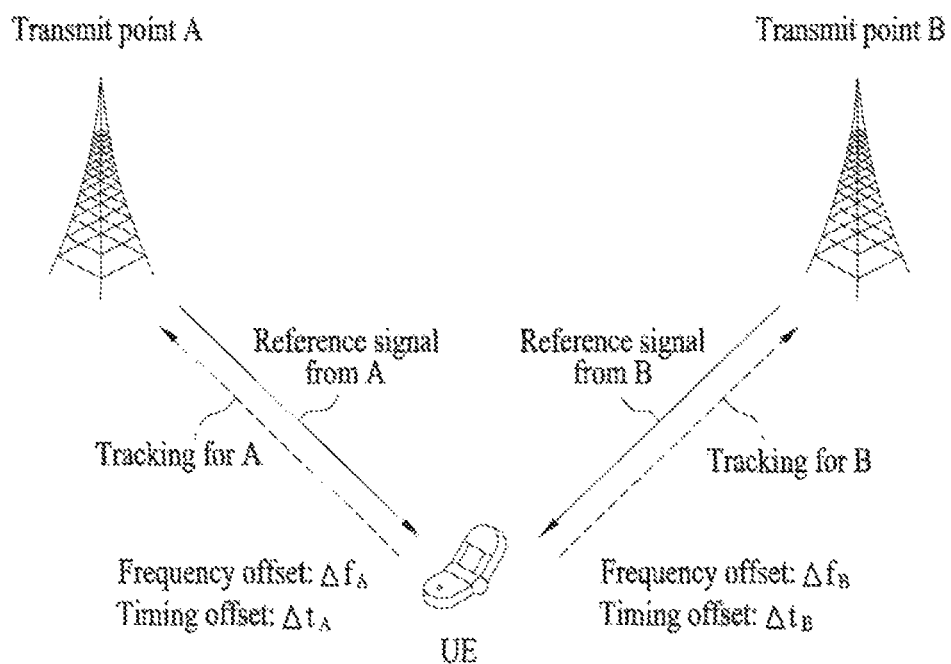
FIG. 14 is a diagram of an example for a user equipment to perform a tracking to obtain synchronization in a multi-cell-based wireless communication system.

FIG. 14 is a diagram of an example for a user equipment to perform a tracking to obtain synchronization in a multicell-based wireless communication system.

Referring to FIG. 14, a user equipment operating in a CoMP mode, i.e., the user equipment operating in the aforementioned PDSCH transmission mode 10 can perform tracking for TPs within a CoMP set as well as a current serving cell (or a serving TP). FIG. 14 shows an example that the user equipment receives a reference signal from a TP A and a reference signal from a TP B to calculate timing offset Δt and frequency offset Δf.

In particular, in case that the TPs within the CoMP set use an identical cell identifier, the user equipment can calculate the timing offset Δt and the frequency offset Δf of each TP in a manner of configuring CSI-RS resources different from each other for every TP and tracking each of the CSI-RSs. On the contrary, in case that the TPs within the CoMP set use cell identifiers different from each other, the user equipment can calculate the timing offset Δt and the frequency offset Δf of each TP in a manner of tracking a CRS differently configured for every TP by a different method except the method of configuring the CSI-RS resources different from each other for every TP.

Meanwhile, if there exist a plurality of information including timing offset and frequency offset which is calculated by the user equipment by tracking a reference signal and it is not able to know information on a TP from which a currently received PDSCH is transmitted, the UE is not able to know information on timing offset and frequency offset becoming a criterion of performing synchronization acquisition and DM-RS based PDSCH demodulation. In particular, the use equipment is not able to know an antenna port of a reference signal, which is in QCL with an antenna port of a DM-RS for the currently received PDSCH.

As a method of selecting an appropriate timing offset and a frequency offset from a plurality of the timing offsets and frequency offsets, it may consider following methods.

1) First of all, a UE may anticipate that a scheduler schedules a TP, which has transmitted a strongest reference signal among a plurality of reference signals tracked by the UE, to transmit PDSCH. Hence, the UE performs the synchronization acquisition and the DM-RS based PDSCH demodulation using the offset information which is calculated by tracking the reference signal measured as the strongest signal. In particular, the UE may assume that the antenna port of the DM-RS for the currently received PDSCH and the antenna port of the reference signal measured as the strongest signal are in QCL.

2) As a different method, a UE may anticipate that PDSCH is simultaneously transmitted from a plurality of TPs among TPs including offsets different from each other within a CoMP set. In this case, the UE can calculate an average value of the offsets calculated from a plurality of the TPs. The UE performs the synchronization acquisition and the DM-RS based PDSCH demodulation using the average offset value. In this case, it may assume that the antenna port of the DM-RS for the currently received PDSCH and a virtual specific antenna port are in QCL. And, it may also understand that a result of tracking the virtual specific antenna port corresponds to the average offset value.

3) As a further different method, a network (e.g., a serving cell) may directly inform a UE of offset information to be used for PDSCH reception and demodulation. The information is semi-statically delivered to the UE via such an upper layer signaling as an RRC layer or can be dynamically delivered via such a physical layer signal as PDCCH. The offset information may correspond to an index or an antenna port of a reference signal set to a TP configured to transmit PDSCH among reference signals tracked by the UE. The UE performs the synchronization acquisition and the DM-RS based PDSCH demodulation using specific offset information corresponding to a result of tracking a reference signal indicated by the network among a plurality of offset information calculated by tracking a plurality of reference signals. In particular, it may assume that the antenna port of the DM-RS for the currently received PDSCH and the antenna port of the reference signal indicated by the network are in QCL.

When a TP transmits a signal, the TP can transmit the signal in a manner of applying scrambling to the signal with a scrambling code to distinguish the signal from a signal transmitted by a different TP. When a UE receives the scrambled signal, the UE can restores the signal by performing a reverse scrambling procedure using a code identical to a code used by the TP.

The scrambling code is a common name for promised information delivered to the UE from the TP in order for the UE to precisely perform PDSCH demodulation. The scrambling code is not limited to a specific signaling. For instance, the scrambling code may correspond to a scrambling sequence put on PDSCH to protect data or reference signal configuration information such as an RE position, sequence and the like of a CRS or a DM-RS necessary for performing PDSCH demodulation. Moreover, the scrambling code may correspond to an index of a component carrier to which the PDSCH is transmitted in case of applying carrier aggregation scheme.

Hence, a scrambling code used for transmitting PDSCH may vary according to every TP within a CoMP set. In particular, in case that a TP transmitting PDSCH is dynamically changing such as a dynamic TP selection (DPS) scheme, a network should dynamically inform a UE of a precise scrambling code necessary for demodulating PDSCH via PDCCH. Hence, the network can inform the UE of the scrambling code used by each TP within the CoMP set to transmit PDSCH and reference signal configuration information of the corresponding TP in advance. The information can be semi-statically transmitted via such an upper layer signaling as an RRC layer signal. Table 3 in the following is an example of the scrambling code of the TP and the reference signal configuration information informed to the UE by the network.

TABLE 3

| Configuration | Scrambling code | Reference signal |
|---|---|---|
| 1 | SCID1 | RS-A |
| 2 | SCID2 | RS-B |
| 3 | SCID3 | RS-C |
| ... | ... | ... |

The network can make each of TPs use configurations different from each other, respectively among the configurations depicted in Table 3. Each TP uses a scrambling code and a reference signal of a promised combination according to a determined combination shown in Table 3.

Assume that a reference signal depicted in Table 3 corresponds to a CSI-RS. Since a UE stores such information shown in Table 3 in advance, although the UE receives scrambling code indicator (SCID #) information from the network only, the UE is able to know how a CSI-RS resource, which is used by a TP transmitting PDSCH, is configured, which CSI-RS can be assumed for QCL with a CRS or a DM-RS necessary for performing PDSCH demodulation and the like. Hence, the UE can perform synchronization acquisition and PDSCH demodulation using a plurality of offset information calculated by CSI-RS tracking without a separate signaling from the network for synchronization acquisition.

Figure 15:
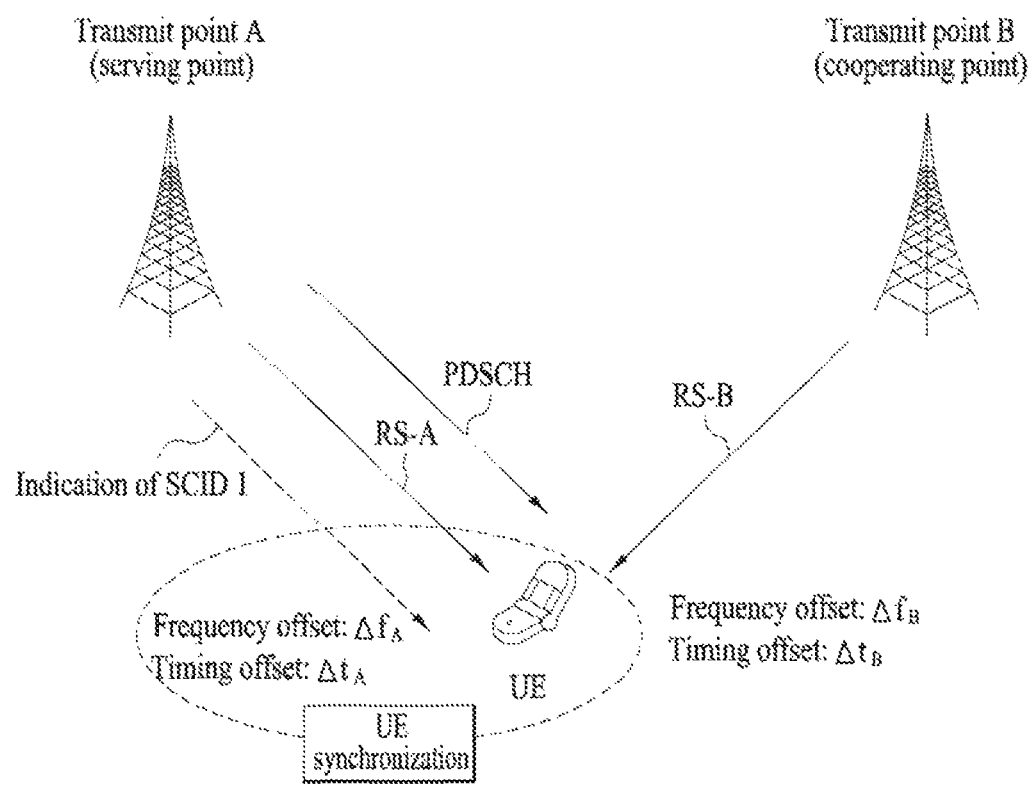
FIG. 15 is a diagram of an example for a user equipment to perform a reference signal tracking according to embodiment of the present invention.

FIG. 15 is a diagram of an example for a user equipment to perform a reference signal tracking according to embodiment of the present invention. As mentioned in the foregoing description, the UE is tracking a reference signal A (RS-A) set to the UE and a reference signal B (RS-B) and can obtain each offset information (i.e., timing offset and frequency offset information based on the reference signal A, timing offset and frequency offset information based on the reference signal B). In this case, the UE is unable to know which timing offset and frequency offset are should be used to obtain synchronization among the two timing offsets and the frequency offsets. In the following, for clarity, the reference signal A and the reference signal B are called a CSI-RS A and a CSI-RS B, respectively.

Referring to FIG. 15, a network can inform a UE of a SCID 1 as information necessary for demodulating PDSCH while transmitting the PDSCH via a TP-A. In this case, as mentioned in the foregoing description, the SCID 1 may correspond to a scrambling sequence, DM-RS resource configuration information, or CRS resource configuration information.

In this case, although the UE is unable to know that a TP actually transmitting the PDSCH corresponds to the TP-A, the UE can perform synchronization acquisition and PDSCH demodulation with offset calculated by tracking a CSI-RS A via a pre-stored scrambling code and reference signal configuration information depicted in Table 3. In particular, the UE can assume that an antenna port of a DM-RS or a CRS for a currently received PDSCH and an antenna port of the CSI-RS A are in QCL.

Figure 16:
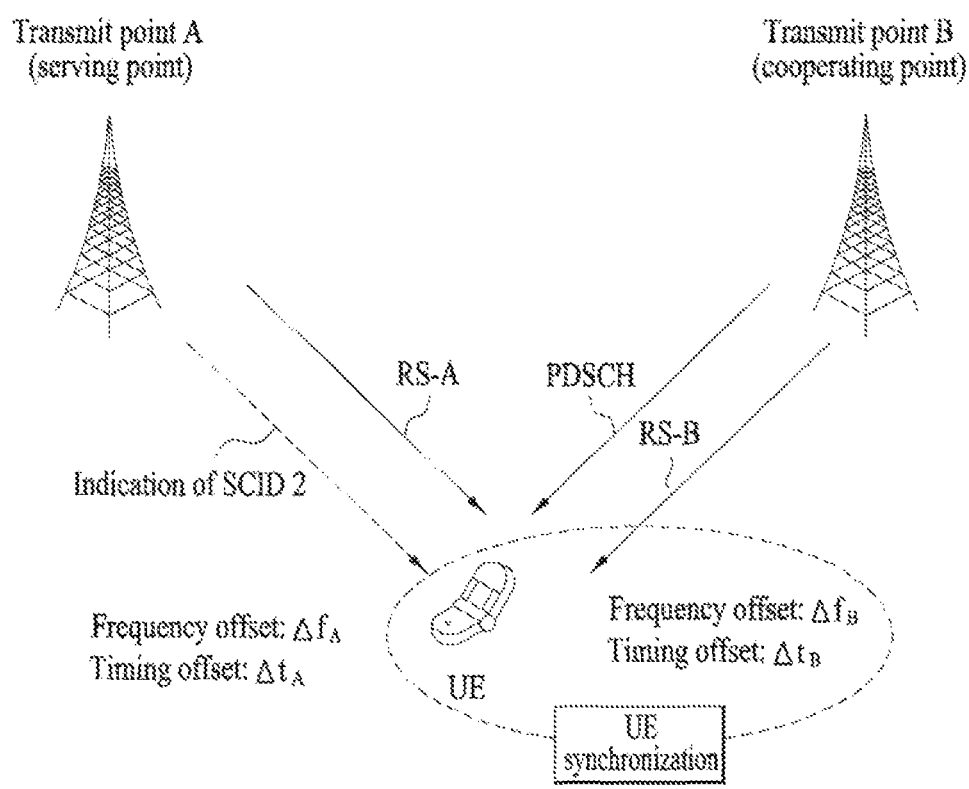
FIG. 16 is a diagram of a different example for a user equipment to perform a reference signal tracking according to embodiment of the present invention.

FIG. 16 is a diagram of a different example for a user equipment to perform a reference signal tracking according to embodiment of the present invention.

Referring to FIG. 16, a network can inform a UE of a SCID 2 as information necessary for demodulating PDSCH while transmitting the PDSCH via a TP-B. In this case, although the UE is unable to know that a TP actually transmitting the PDSCH corresponds to the TP-B, the UE can perform synchronization acquisition and PDSCH demodulation with offset calculated by tracking a CSI-RS B via a pre-stored scrambling code and reference signal configuration information depicted in Table 3. In particular, the UE can assume that an antenna port of a DM-RS or a CRS for a currently received PDSCH and an antenna port of the CSI-RS B are in QCL.

In the following, a method for a network to inform offset information to be used by a UE to receive and demodulate DM-RS (or CRS) based PDSCH, i.e., a method of signaling information on an antenna port where QCL assumption is feasible is explained in detail.

And, for clarity, assume a case that PDSCH is transmitted and demodulated based on a DM-RS and an antenna port being QCL with an antenna port of the DM-RS is signaled in the following signaling methods. Yet, it is apparent that the signaling methods can also be applied to a case that the PDSCH is transmitted and demodulated based on a CRS.

<Signaling Method 1>

When a UE receives scheduling information of a DM-RS based PDSCH from PDCCH or E-PDCCH, it may consider a method of dynamically signaling whether a corresponding DM-RS antenna port(s) and a different reference signal (e.g., a CRS of a serving cell, a different CSI-RS or the like) are in QCL.

A) First of all, the present invention proposes to define signaling of 1 bit long and dynamically signal whether a QCL assumption with a different reference signal (i.e., a CRS of a serving cell, a different CSI-RS or the like) is feasible. By doing so, when a CoMP DPS scheme is applied, if a DM-RS based PDSCH is transmitted from a TP where the QCL assumption is feasible, demodulation capability of the DM-RS based PDSCH can be enhanced in a manner of transmitting an indicator indicating that QCL assumption with the different reference signal is feasible together with scheduling information of the DM-RS based PDSCH.

B) As a different method, it may consider a method of semi-statically configuring QCL information between a CSI-RS (or, a CRS) and a DM-RS to a plurality of states via RRC signaling and the like and a method of indicating one of a plurality of the states in case of transmitting scheduling information of a DM-RS based PDSCH.

For instance, if an indicator of 2 bits is defined to indicate a state of scheduling information of a DM-RS based PDSCH, each state can be defined as depicted in Table 4 and Table 5.

TABLE 4

| 00 | NQCL |
| 01 | CRS of serving cell |
| 10 | $1^{st}$ Set of QCL pair (configured by RRC layer) |
| 11 | $2^{nd}$ Set of QCL pair (configured by RRC layer) |

Referring to Table 4, if an indicator of 2-bit long included in the scheduling information of the DM-RS based PDSCH corresponds to "00", the indicator indicates that a corresponding DM-RS cannot assume QCL with any reference signal, i.e., NQCL. If the indicator corresponds to "01", it indicates that the corresponding DM-RS can assume QCL with a CRS of a serving cell. And, if the indicator corresponds to "10" or "11", it indicates a QCL pair predefined via an RRC signaling. In this case, the QCL pair may indicate that QCL is applied between the DM-RS applied to the corresponding PDSCH and a specific CSI-RS. For instance, "$1^{st}$ Set of QCL pair" can be configured by QCL assumption between the DM-RS applied to the corresponding PDSCH and a CSI-RS where a resource configuration corresponds to #0. "$2^{nd}$ Set of QCL pair" can be configured by QCL assumption between the DM-RS applied to the corresponding PDSCH and a CSI-RS where a resource configuration corresponds to #1.

TABLE 5

| 00 | $1^{st}$ Set of QCL pair (configured by RRC layer |
| 01 | $2^{nd}$ Set of QCL pair (configured by RRC layer) |
| 10 | $3^{rd}$ Set of QCL pair (configured by RRC layer |
| 11 | $4^{th}$ Set of QCL pair (configured by RRC layer) |

Referring to Table 5, if an indicator of 2-bit long included in the scheduling information of the DM-RS based PDSCH corresponds to "00" to "11", all of the indicators indicate QCL pair predefined via RRC signaling. In this case, the QCL pair may indicate that QCL is applied between a DM-RS applied to a corresponding PDSCH and a specific CSI-RS.

C) As a further different method, among DM-RS configuration (or resource) included in the scheduling information (e.g., a DCI format 2C defined by LTE system) of the DM-RS based PDSCH, it may consider a method of implicitly signaling whether there is QCL or NQCL between a corresponding DM-RS antenna port(s) and a different reference signal (a CRS or a CSI-RS of a serving cell) according to an nSCID value.

In particular, since the nSCID of a DM-RS sequence is defined by a value of 0 or 1 in general, as depicted in Table 3, QCL or NQCL mapping information between DM-RS antenna port(s) and antenna port(s) of a different reference signal is configured in advance in the nSCID via an upper layer. In case that a UE receives the scheduling information of the DM-RS based PDSCH via PDCCH or E-PDCCH, the UE can apply preconfigured QCL/NQCL assumption between the DM-RS antenna port(s) and the antenna port(s) of the different reference signal according to the nSCID value included in the scheduling information.

And, a DM-RS sequence scrambling seed value X may be mapped to the nSCID value 0 and/or 1. According to whether the seed value X is identical to a PCI of a specific CRS antenna port(s), it may interpret whether QCK assumption is feasible. In particular, if the seed value X is identical to the PCI of the specific CRS antenna port(s), it may interpret as the QCL assumption between the corresponding DM-RS antenna port(s) and corresponding CRS antenna port(s) is feasible. If the seed value X is not identical to the PCI of the specific CRS antenna port(s), it may interpret as NQCL is assumed between the corresponding DM-RS antenna port(s) and the corresponding CRS antenna port(s).

Similarly, according to whether the seed value X is identical to a CSI-RS sequence scrambling seed value Y of a specific CSI-RS antenna port(s), it may interpret whether QCK assumption is feasible. In particular, if the seed value X is identical to the seed value Y, it may interpret as the QCL assumption between the corresponding DM-RS antenna port(s) and corresponding CSI-RS antenna port(s) is feasible. If the seed value X is not identical to the seed value Y, it may interpret as NQCL is assumed between the corresponding DM-RS antenna port(s) and the corresponding CSI-RS antenna port(s).

<Signaling Method 2> a) Meanwhile, in the foregoing description, it has been explained that a DCI format for a fallback mode is defined as downlink control information for a specific transmission mode. Unlike a general DCI format, since the DCI format for the fallback mode, i.e., a DCI format 1A is very limitative in defining a new field, when the DCI format 1A is received as scheduling information of the DM-RS based PDSCH, it is necessary to consider a different method for applying QCL assumption between a DM-RS and a different reference signal.

For instance, when a transmission mode 10 is configured and scheduling information of PDSCH is received by the DCI format 1A in an MBSFN subframe, as defined in Table 1, a UE should receive the PDSCH based on a specific DM-RS antenna port (e.g., DM-RS antenna port 7 in Table 1). In this case, the UE may fixedly operate to make QCL assumption to be always feasible between the DM-RS antenna port 7 and a CRS antenna port(s) of a serving cell (or a specific CSI-RS antenna port(s)).

b) Or, whether to apply QCL assumption can be determined according to a type of a search space in which scheduling information of PDSCH (in which QCL information is not included) is detected. For instance, if the scheduling information is detected in a common search space (CSS), it may interpret as QCL assumption is always feasible between the corresponding DM-RS antenna port(s) and CRS antenna port(s) of a serving cell of the DM-RS antenna port(s). On the contrary, if the scheduling information is detected in a UE-specific search space (USS), it may interpret as there exist a NQCL relation between the DM-RS antenna port(s) and an antenna port of a different reference signal.

c) There may exist a hybrid form of the aforementioned a) and b). For instance, in case of receiving a DCI format 1A in the CSS in an MBSFN subframe, it may interpret as QCL assumption is feasible between the corresponding DM-RS antenna port and CRS antenna port(s) of a serving cell (or a specific CSI-RS antenna port(s)). In case of receiving the DCI format 1A in the USS in the MBSFN subframe, it may interpret as QCL assumption is feasible between the corresponding DM-RS antenna port and an antenna port of a different reference signal.

Figure 17:
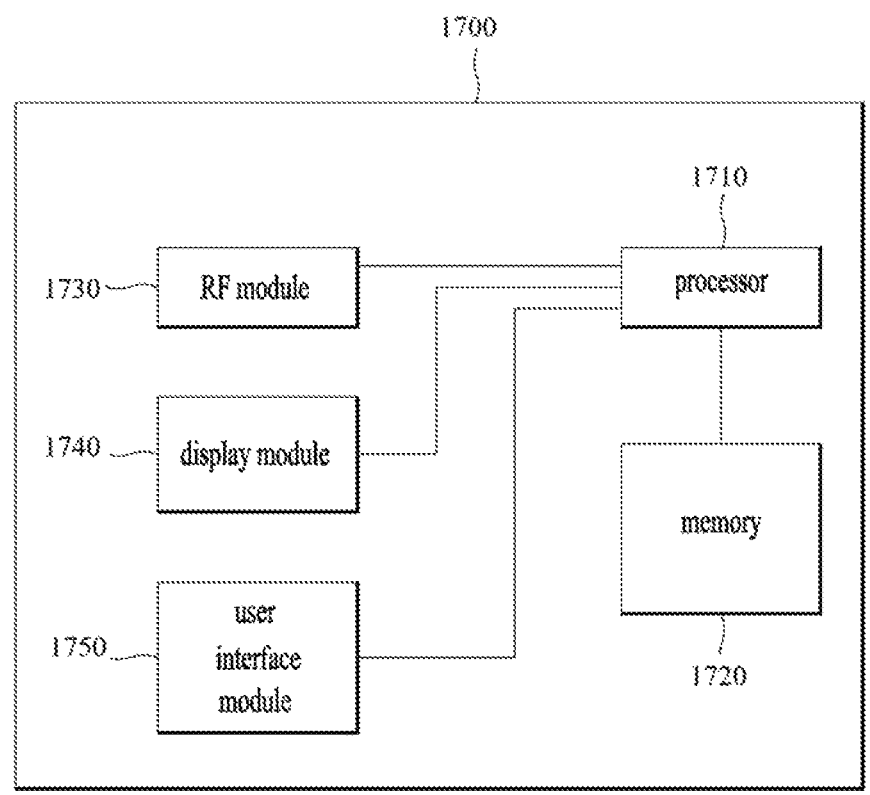
FIG. 17 is a block diagram for an example of a communication device according to one embodiment of the present invention.

FIG. 17 is a block diagram for an example of a communication device according to one embodiment of the present invention.

Referring to FIG. 17, a communication device 1700 may include a processor 1710, a memory 1720, an RF module 1730, a display module 1740, and a user interface module 1750.

Since the communication device 1700 is depicted for clarity of description, prescribed module(s) may be omitted in part. The communication device 1700 may further include necessary module(s). And, a prescribed module of the communication device 1700 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of informations. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Although a method of receiving a downlink data channel in a multicell-based wireless communication system and an apparatus therefor are described with reference to examples applied to 3GPP LTE system, it may be applicable to various kinds of wireless communication systems as well as the 3GPP LTE system.

What is claimed is:

1. A method for receiving a user equipment (UE)-specific reference signal based-downlink data channel by a UE in a wireless communication system, the method comprising:
   receiving, by the UE, a downlink control channel from a network; and
   receiving, by the UE, the UE-specific reference signal based-downlink data channel from the network based on the downlink control channel,
   wherein the downlink control channel includes an indicator indicating one of two or more parameters configured by a higher layer, and
   wherein the two or more parameters indicate certain reference signals which are assumed to be quasi co-located with a UE-specific reference signal.

2. The method of claim 1, wherein a large scale property for the UE-specific reference signal is obtained based on the certain reference signals which are assumed to be quasi co-located with the UE-specific reference signal.

3. The method of claim 1, wherein the certain reference signals are channel status information-reference signals (CSI-RSs).

4. A method for transmitting a user equipment (UE)-specific reference signal based-downlink data channel by a base station (BS) in a wireless communication system, the method comprising:
   transmitting, by the BS, a downlink control channel to a UE; and transmitting, by the BS, the UE-specific reference signal based-downlink data channel to the UE based on the downlink control channel, wherein the downlink control channel includes an indicator indicating one of two or more parameters configured by a higher layer, and wherein the two or more parameters indicate certain reference signals which are assumed to be quasi co-located with a UE-specific reference signal.

5. The method of claim 4, wherein a large scale property for the UE-specific reference signal is obtained based on the certain reference signals which are is assumed to be quasi co-located with the UE-specific reference signal.

6. The method of claim 4, wherein the certain reference signals are channel status information-reference signals (CSI-RSs).

7. A user equipment (UE) in a wireless communication system, the UE comprising:
a radio frequency (RF) module; and
a processor configured to control the RF module to:
receive a downlink control channel from a network, and
receive a UE-specific reference signal based-downlink data channel from the network based on the downlink control channel,
wherein the downlink control channel includes an indicator indicating one of two or more parameters configured by a higher layer, and
wherein the two or more parameters indicate certain reference signals which are assumed to be quasi co-located with a UE-specific reference signal.

8. The UE of claim 7, wherein a large scale property for the UE-specific reference signal is obtained based on the certain reference signals which are assumed to be quasi co-located with the UE-specific reference signal.

9. The UE of claim 7, wherein the certain reference signals are channel status information-reference signals (CSI-RSs).

10. A base station (BS) in a wireless communication system, the BS comprising:
a radio frequency (RF) module; and
a processor configured to control the RF module to:
transmit a downlink control channel to a user equipment (UE), and
transmit a UE-specific reference signal based-downlink data channel to the UE based on the downlink control channel,
wherein the downlink control channel includes an indicator indicating one of two or more parameters configured by a higher layer, and
wherein the two or more parameters indicate certain reference signals which are assumed to be quasi co-located with a UE-specific reference signal.

11. The BS of claim 10, wherein a large scale property for the UE-specific reference signal is obtained based on the certain reference signals which are assumed to be quasi co-located with the UE-specific reference signal.

12. The BS of claim 10, wherein the certain reference signals are channel status information-reference signals (CSI-RSs).

* * * * *